United States Patent [19]
Smith

[11] Patent Number: 5,934,756
[45] Date of Patent: Aug. 10, 1999

[54] PIVOTABLE ARM REST WITH RETAINING SPRING

[75] Inventor: John G. Smith, West Liberty, Iowa

[73] Assignee: UT Automotive Dearborn, Inc., Dearborn, Mich.

[21] Appl. No.: 09/078,876

[22] Filed: May 14, 1998

[51] Int. Cl.[6] ..................................................... A47C 7/54
[52] U.S. Cl. ................... 297/411.32; 297/411.2
[58] Field of Search .............................. 297/463.1, 411.2, 297/411.3, 411.32, 411.35, 411.38, 411.39

[56] References Cited

U.S. PATENT DOCUMENTS

| | | | |
|---|---|---|---|
| 3,807,799 | 4/1974 | Freedman | 297/411.32 |
| 4,040,665 | 8/1977 | Wallace et al. | 297/411.32 |
| 4,902,072 | 2/1990 | Chancellor, Jr. | 297/411.32 |
| 5,316,373 | 5/1994 | Markel | 297/411.32 |
| 5,597,209 | 1/1997 | Bart et al. | 297/411.32 X |

*Primary Examiner*—Milton Nelson, Jr.
*Attorney, Agent, or Firm*—Howard & Howard

[57] ABSTRACT

A vehicle seat assembly includes a seat bottom with a seat back supported on the seat bottom. An armrest is pivotally attached to one side of the seat back, and can pivot between a stowed position and an operable position. In the stowed position the armrest is vertically aligned with the seat back and in the operable position the armrest extends generally outwardly from the seat back so that a user can rest their arm on the armrest. The armrest is received by a support rod that extends outwardly from one side of the seat back. The armrest includes a substantially rigid insert member and a resilient retaining member. The resilient retaining member is installed in the insert member and the insert member is then pressed onto the support rod such that the resilient retaining member engages both the insert member and the support rod to secure the armrest to the seat back.

14 Claims, 2 Drawing Sheets

PIVOTABLE ARM REST WITH RETAINING SPRING

BACKGROUND OF THE INVENTION

This application relates to a unique mounting apparatus for pivotally securing an armrest to a vehicle seat assembly.

When driving or riding as a passenger in a vehicle it is desirable to be as comfortable as possible. One way to provide comfort to vehicle occupants is to have a place to rest your arms. As a result, seat assemblies, particularly those in larger-sized vehicles, usually include armrests.

Typically, armrests are attached to a side of a vehicle seat back. These armrests pivot between a raised or stowed position and a lowered position. In the raised position, the armrest usually is aligned vertically with the seat back. This stows the armrest out of the way of vehicle occupants to facilitate movement about a vehicle's passenger compartment. When in the lowered or operable use position, the armrest extends horizontally outwardly from the seat back and provides a support for the seat occupant's arm.

There are various ways that an armrest can be attached to a seat assembly. One known attachment method requires the armrest to have a hole extending through its width. A bolt is inserted through the hole for attaching of the armrest to the seat frame. A cap typically covers the hole once the armrest is attached to the seat back, but this leaves an unsightly mark on the exterior surface of the armrest, which can be seen by occupants. Additionally, many known armrests have a significant amount of mounting hardware that is required to install an armrest onto a seat assembly. When many parts are used to mount the armrest to the seat it also increases labor time and cost.

Therefore it is desirable to have an armrest that is easy to assemble onto a vehicle seat assembly and that reduces the required number of parts and the amount of labor necessary for installation. It is also desirable to have an aesthetically improved armrest that presents an unmarked external surface.

SUMMARY OF THE INVENTION

A vehicle seat assembly includes a cushioned seat back that is supported on a cushioned seat bottom. The seat back includes an armrest that can pivot relative to the seat back between stowed and operable positions. In the stowed position the armrest is vertically aligned with the seat back and in the operable position the armrest extends generally outwardly from the seat back so that a user can rest their arm on the armrest while sitting in the seat. The armrest is preferably received by a support rod that extends outwardly from one side of the seat back.

In a preferred embodiment of this invention, a vehicle seat assembly includes a seat bottom, a seat back supported on the seat bottom, and an armrest pivotally attached to the seat back. The armrest has a substantially rigid insert member and a resilient retaining member. The resilient retaining member engages both the insert member and a portion of the seat back to secure the insert member and thus, the armrest, to the seat back.

This invention offers several advantages over prior art systems because it reduces the number of parts required to attach the armrest to the seat back and also reduces the amount of labor required for installation. Also, an armrest designed according to this invention provides an unmarked exterior surface for the armrest.

These and other features of the present invention will be best understood from the following specification and drawings, of which the following is a brief description.

DETAILED DESCRIPTION OF THE PREFERRED EMBODIMENT

Figure 1:
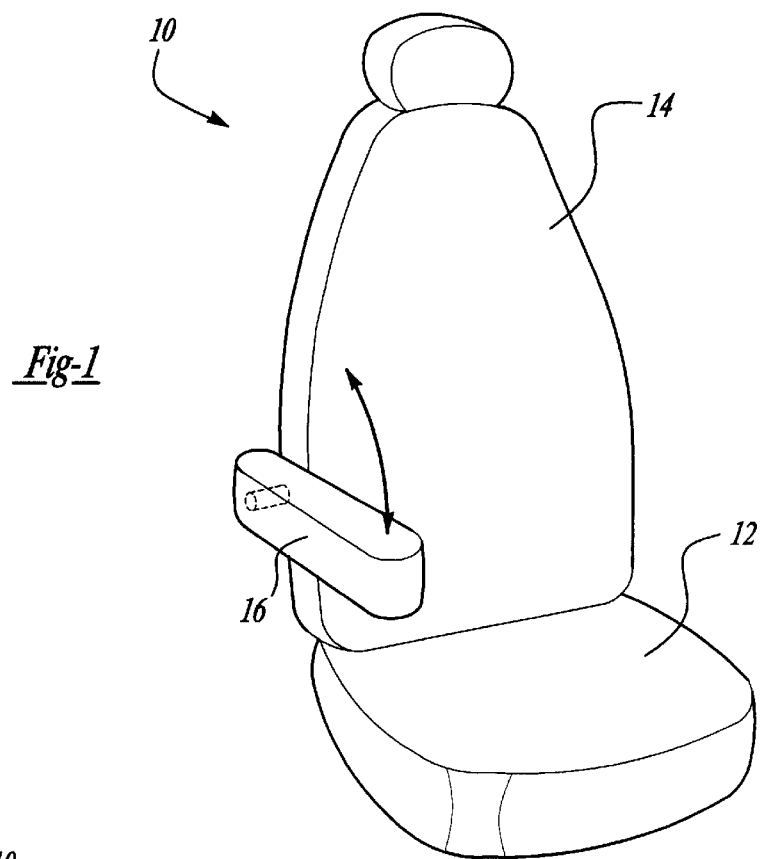
FIG. 1 is a perspective view of a vehicle seat assembly with a pivoting armrest.

Referring to FIG. 1, a vehicle seat assembly is shown generally at 10. The seat assembly is installed in a vehicle (not shown) in a conventional manner and includes a seat bottom 12 and a seat back 14 that is supported on the seat bottom 12. An armrest 16 is pivotally attached to the seat back 14. The armrest 16 can pivot with respect to the seat back 14 between a stowed (non-use) position and an operable (use) position.

In the stowed or non-use position the armrest 16 is pivoted so that it is substantially, vertically aligned with the seat back 14. In this position a vehicle driver or passenger can enter or exit the seat 10 without experiencing interference with the armrest 16. In the operable or use position the armrest 16 extends generally outwardly from the seat back 14 so that a driver or passenger can rest their arm on the armrest 16 while sitting on the seat bottom 12. The armrest 16 also can be easily pivoted out of the way if the passenger does not want to use it while sitting in the seat 10.

Figure 2:
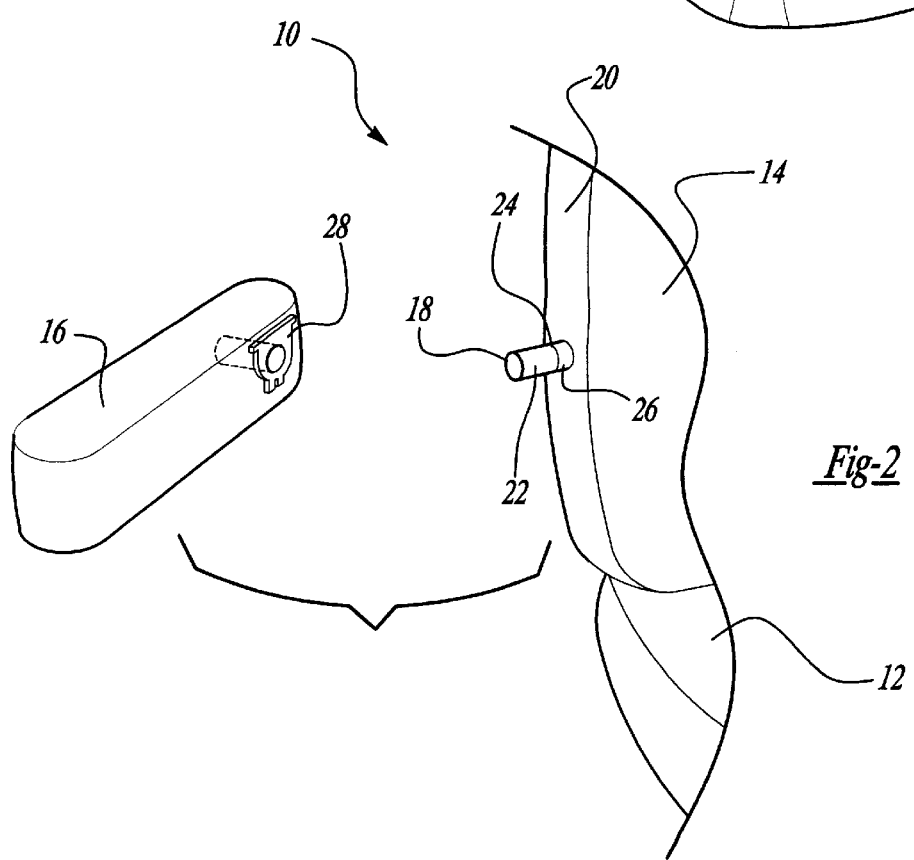
FIG. 2 is an exploded fragmentary perspective view of the seat assembly including an example embodiment of the present invention.

The armrest 16 is supported on the seat back 14 by a support rod 18, shown in FIG. 2. The support rod 18 extends outwardly from one side 20 of the seat back 14 and includes a generally cylindrical body portion 22 with a groove 24 near one end 26. Preferably, the support rod 18 is a stud that is attached to the seat frame (not shown) with one end extending generally perpendicularly from the side 20 of the seat back 14, however, other support members known in the art could also be used.

The armrest includes a substantially rigid insert member 28 or armature. The insert member 28 is preferably made from molded plastic, but other materials such as steel, can be used. The insert member 18 is pressed onto the support rod 18 and secured to the seat back 14 so that the armrest 16 cannot be easily detached from the seat back 14.

Figure 3:
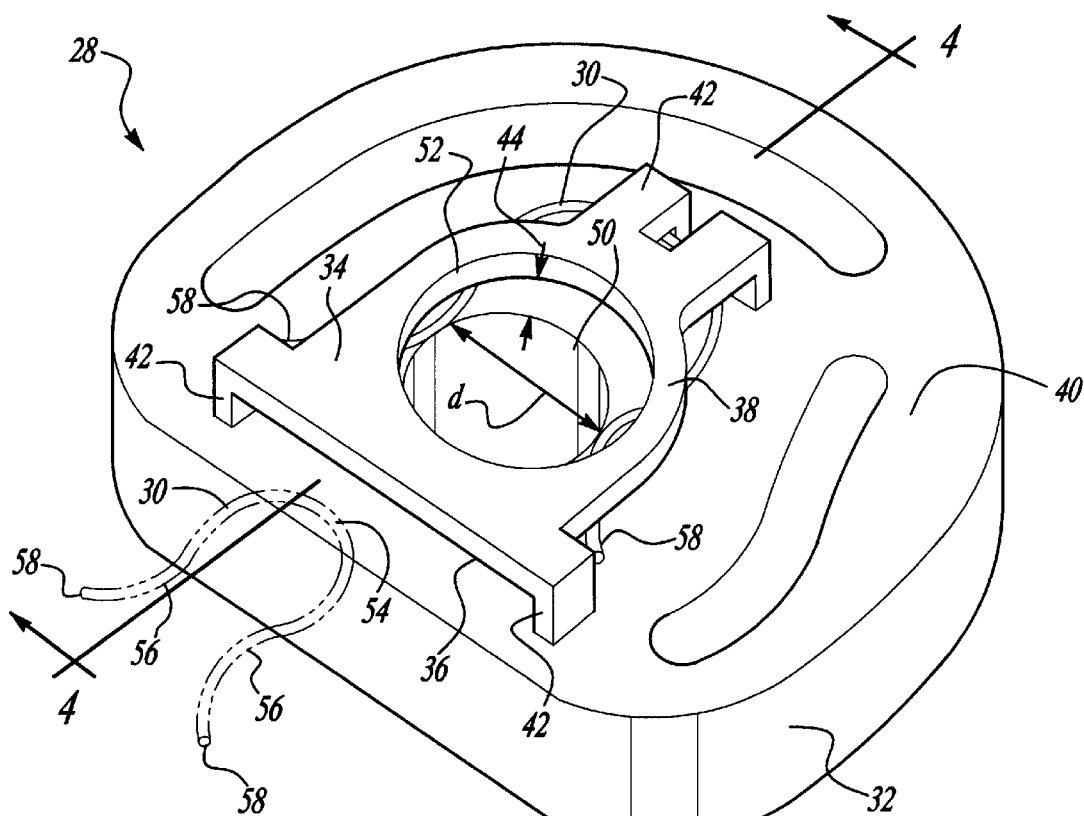
FIG. 3 is an enlarged, perspective view of the embodiment shown in FIG. 2.

The armrest 16 further includes a resilient retaining member 30, shown in FIG. 3, that engages the insert member 28 and a portion of the seat back 14 to secure the insert member 28 to the seat back 14. The resilient retaining member 30 preferably engages the support rod 18. At least a portion of the support rod 18 is received in the insert member 28 and slidably engages the resilient retaining member 30 to secure the armrest 16 to the seat back 14.

The insert member 28 is comprised of a body 32 and a retainer portion 34. Preferably, the body 32 is integrally formed with the retainer portion 34 as one piece. The body 32 and retainer portion 34 together form a channel 36 that receives the resilient retaining member 30. The retainer portion 34 preferably includes a substantially flat portion 38 that is generally parallel to a surface 40 on body 32. The retainer portion 34 further includes a plurality of support members 42 that support the flat portion 38 apart from the surface 40 of the body 32 such that a gap 44 is formed between the surface 40 of the body 32 and the flat portion 38.

The resilient retaining member 30 is preferably installed into the insert member 28 by being slid through the channel 36 and into the gap 44. The armrest 16 is then installed on to the support rod 28 of the seat back 14 such that the resilient retaining member 30 secures the support rod 28 to the insert member 28.

Figure 4:
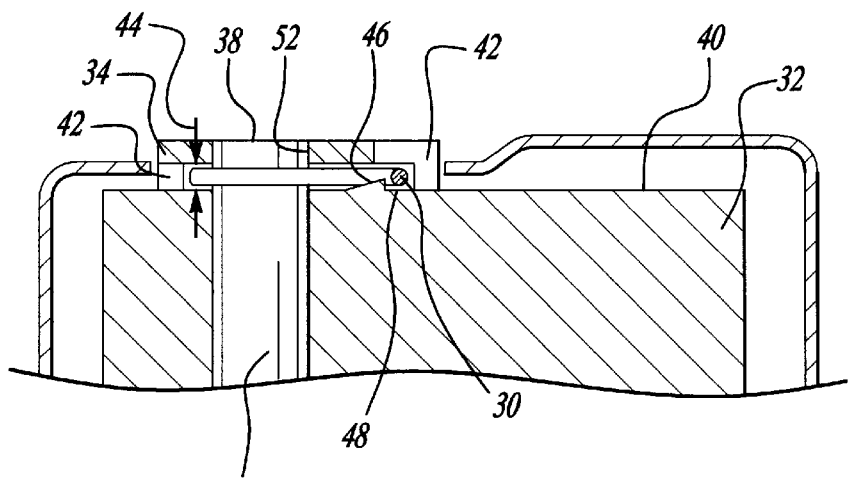
FIG. 4 is a cross sectional view taken along line 4—4 in FIG. 3.

The insert member 28 also preferably includes an inclined portion 46, shown in FIG. 4. The inclined portion 46 can be located on the surface 40 of the body 32 or on the retainer portion 34. Preferably, the inclined portion 46 is located on the surface 40 of the body 32 and slopes toward the flat portion 38. The inclined portion 46 terminates adjacent to one of the support members 42, forming a retaining pocket 48. After the resilient retaining member 30 is inserted into the gap 44, a portion of the retaining member 30 is received in the retaining pocket 48, which prevents the resilient retaining member 30 from later being removed from the gap 44.

The body 32 includes a first opening 50 and the retainer portion 34 includes a second opening 52. The first 50 and second 52 openings are aligned with each other so that they are able to receive the support rod 28. The openings 50, 52 are preferably round so that the armrest 16 can easily pivot on the support rod 28. Thus, the first 50 and second 52 openings have pre-determined diameters that are slightly greater than a diameter of the support rod 28.

The resilient retaining member 30 preferably is a spring that includes a central base portion 54, a pair of spring arms 56, and a pair of spring ends 58. The spring arms 56 are flexible and extend radially inwardly towards each other from the central base portion 54. The spring arms 56 terminate at the spring ends 58 which extend away from the central base portion 54. Thus, the resilient retaining member is a generally U-shaped piece with inwardly deflecting spring arms 56 that terminate at diverging spring ends 58. The resilient retaining member 30, is preferably made from a spring steel, however, other materials can be used.

The retainer portion 34 preferably has three (3) support members 42 spaced apart from one another around a circumference of the opening 52. When the resilient retaining member 30 is slid into the gap 44, the central base portion 54 is received against one of the support members 42, shown in FIG. 4. Also, each of the spring ends 58 are received against one of the other two support members 42. This configuration securely holds the resilient spring member 30 in the insert member 28.

The spring arms 56 are biased toward each other and spaced apart from one another by a distance "d" that is less than the diameters of the openings 50, 52. This means that the spring arms 56 deflect outwardly as support rod 28 is inserted into the insert member 28. Specifically, as armrest 16 is pushed onto the support rod 28, the cylindrical body portion 22 of the support rod is inserted through the openings 50, 52 in the insert member 28 causing the spring arms 56 to flex outwardly. The spring arms 56 slide along the cylindrical body portion 22 of the support rod 28 until they reach the groove 24. The spring arms 56 retract inwardly into the groove 24 and lock the support rod 28 into place.

This attachment allows the armrest 16 to easily pivot with respect to the seat back 14 while being securely held in place by the insert member 28 and resilient retaining member 30. The bias on the spring arms 56 also provides a stabilizing effect, which assists in maintaining the armrest 16 in a desired orientation relative to the seat back. Additionally, the attachment reduces the number of required parts and the amount of labor need to install the armrest 16 onto the seat back 14.

The preceding description is exemplary rather than limiting in nature. Various modifications to the illustrative embodiment, and additional embodiments of the invention, may become apparent to persons skilled in the art after reading this description that do not depart from the spirit and scope of the invention, as recited in the appended claims. Alternate embodiments may include, for example, modifications such as using different materials and/or reorientating the various armrest components with respect to one another.

Additionally, it should be noted that this invention can be used on any of the various types of armrests known in the art. For example, the armrest can be of the foam type, where the foam is sprayed around a PVC skin surrounding the insert member 28 which is then covered by upholstery, vinyl, or leather. The foam armrest would then be slid onto the support rod 28 and retained to the seat back 14 by the resilient retaining member 30.

Preferred embodiments of this invention have been disclosed, however, a worker of ordinary skill in the art would recognize that certain modifications would come within the scope of this invention. For that reason, the following claims should be studied to determine the true scope and content of this invention.

I claim:

1. A vehicle seat assembly comprising:

a seat bottom:

a seat back supported on said seat bottom; and an armrest pivotally attached to said seat back and having a substantially rigid insert member fixed to said armrest, said insert member forming a pocket for receiving and retaining a resilient retaining member within said insert member, said retaining member engaging a portion of said seat back to secure said insert member to said seat back wherein said insert member is comprised of a body integrally formed with a retainer portion, said retainer portion and said body forming a channel at one end of said insert member opposite from said pocket, said resilient retaining member being inserted through said channel with one end of said retaining member being received in said pocket.

2. A vehicle seat assembly comprising:

a seat bottom;

a seat back supported on said seat bottom; and an armrest pivotally attached to said seat back and having a substantially rigid insert member fixed to said armrest, said insert member forming a pocket for receiving and retaining a resilient retaining member within said insert member, said retaining member engaging a portion of said seat back to secure said insert member to said seat back wherein said resilient retaining member has a central base portion, radially inwardly deflecting spring arms, and two diverging spring ends extending away from said central base portion and said insert member includes a body and a retainer portion that is spaced from said body and supported by three support members, said resilient retaining member being received within the space between said body and said retainer portion and wherein said central base portion of said resilient retaining member is received against one of said support members such that said resilient retaining member is prevented from exiting the space between said body and said retainer portion.

3. An armrest assembly for pivotal attachment to a vehicle seat assembly, comprising:

an armrest component;

a substantially rigid insert body fixed to said armrest component;

a retainer supported on and spaced from a surface on said body, said retainer including a substantially flat portion that is generally parallel to said surface on said insert body; and a resilient retaining member for securing said insert body to a seat support, said resilient retaining member being inserted between said surface of said body and said retainer portion wherein said retainer is integrally formed with said body as a single piece.

4. An armrest assembly as recited in claim 3, wherein said body includes a first opening and said retainer includes a second opening, aligned with said first opening, said openings receiving the support rod and said resilient retaining member including arm portions that are biased toward each other a distance smaller than a diameter of said openings such that said arm portions engage the rod.

5. An armrest assembly as recited in claim 3 including a plurality of support members that support said flat portion apart from said surface of said body such that a gap is formed between said surface and said flat portion and wherein said resilient retaining member has a central base portion and two diverging spring ends extending away from said central base portion, said resilient retaining member being inserted into said gap such that said base portion and said spring ends engage said support members.

6. An armrest assembly as recited in claim 3 including a retaining pocket formed between said insert body and said retainer for receiving said resilient retaining member.

7. An armrest assembly as recited in claim 6 wherein said retaining pocket includes lip for retaining said resilient retaining member within said pocket.

8. A seat assembly as recited in claim 1, wherein said retainer portion includes a substantially flat portion that is generally parallel to a surface on said body, and a plurality of support members that support said flat portion apart from said surface of said body such that a gap is formed between said surface and said flat portion.

9. A seat assembly as recited in claim 8, wherein said resilient retaining member is inserted into said gap for securing a support rod to said insert member.

10. A seat assembly as recited in claim 9, wherein one of said body or said flat portion includes an inclined portion, sloping toward the other of said body or flat portion, said inclined portion terminating adjacent to one of said support members such that a retaining pocket is formed for receiving said resilient retaining member into said gap and preventing said resilient retaining member from being later removed from said gap.

11. A seat assembly as recited in claim 10, wherein said body includes a first opening and said retainer portion includes a second opening, aligned with said first opening, said openings receiving said support rod.

12. A seat assembly as recited in claim 11, wherein said resilient retaining member is a spring that has a central base portion, radially inwardly deflecting spring arms, and two diverging spring ends extending away from said central base portion.

13. A seat assembly as recited in claim 12, wherein said first and second openings have predetermined diameters and said spring arms are biased toward each other and spaced apart a distance that is less than said diameters of said openings.

14. A seat assembly as recited in claim 13, wherein said rod includes a generally cylindrical body portion with a groove near one end, said spring arms flexing outwardly as said body portion of said rod is inserted through said openings, and retracting inwardly into said groove when said rod is fully received by said insert member.

* * * * *